United States Patent [19]

Spisak

[11] 4,019,013
[45] Apr. 19, 1977

[54] APPARATUS FOR WELDING STUDS
[75] Inventor: Steve Spisak, Elyria, Ohio
[73] Assignee: TRW Inc., Cleveland, Ohio
[22] Filed: Apr. 7, 1975
[21] Appl. No.: 565,535
[52] U.S. Cl. .................................. 219/98; 219/99
[51] Int. Cl.² .......................................... B23K 9/20
[58] Field of Search ....................... 219/98, 99, 103

[56] References Cited
UNITED STATES PATENTS

| | | | |
|---|---|---|---|
| 2,806,934 | 9/1957 | Andersson et al. | 219/103 |
| 3,293,402 | 12/1966 | Graham | 219/98 |
| 3,758,743 | 9/1973 | Lake | 219/98 |
| 3,854,027 | 12/1974 | Ettinger et al. | 219/98 |
| 3,885,122 | 5/1975 | Morris | 219/98 |

Primary Examiner—Bruce A. Reynolds
Assistant Examiner—N. D. Herkamp
Attorney, Agent, or Firm—Allen D. Gutchess, Jr.

[57] ABSTRACT

The welding of studs by a drop technique is provided, including provisions for the rapid feeding of the studs to a chuck. In this type of welding, a stud is held a predetermined distance above a workpiece with an electrical potential established therebetween. The stud is held in a chuck which, in turn, is carried by a ram. The stud, the chuck, and the ram are allowed to drop the predetermined distance to the workpiece, at which time the stud becomes fused thereto. Weights are often applied to the ram and the distance of the stud above the workpiece can be varied to achieve a proper weld for a particular workpiece. Means are provided to rapidly supply studs to the chuck and include a chuck leg forming a loading passage and carrying the chuck at an end thereof. A feed passage communicates with the side of the loading passage and feeds studs thereinto from a remote supply source. A back-up plunger is affixed directly to the ram and extends into the loading passage of the chuck leg. The back-up plunger is stationary and the chuck leg and the chuck are moved by a pneumatically-operated cylinder carried by the ram to position the back-up plunger behind the feed passage when a stud is being fed and to position the plunger near the chuck to back-up the stud when the stud is in welding position with an end protruding from the chuck. Since the plunger is affixed to the ram, it is rigid and the studs will not bounce during welding, as has heretofore occurred.

19 Claims, 7 Drawing Figures

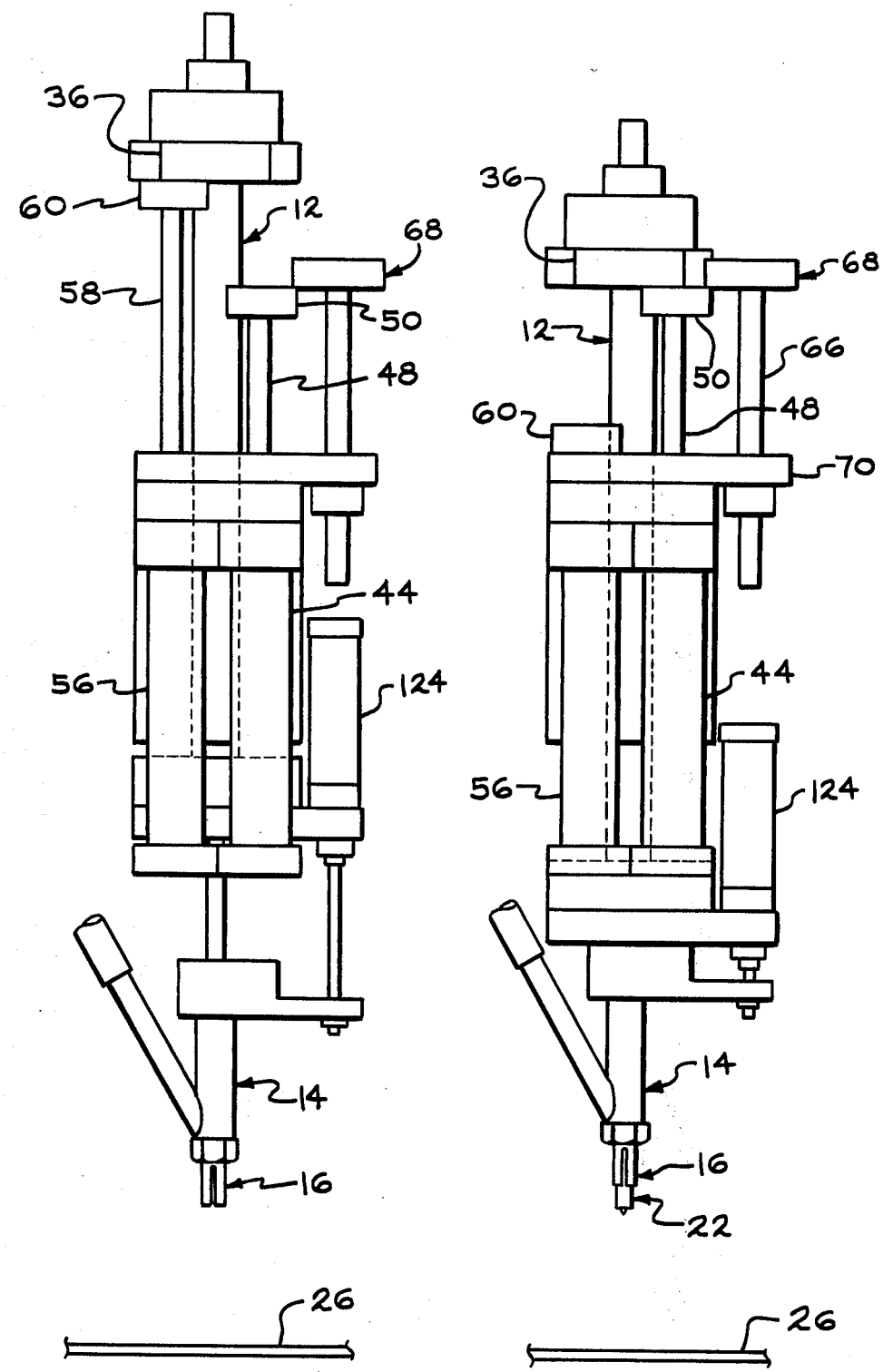

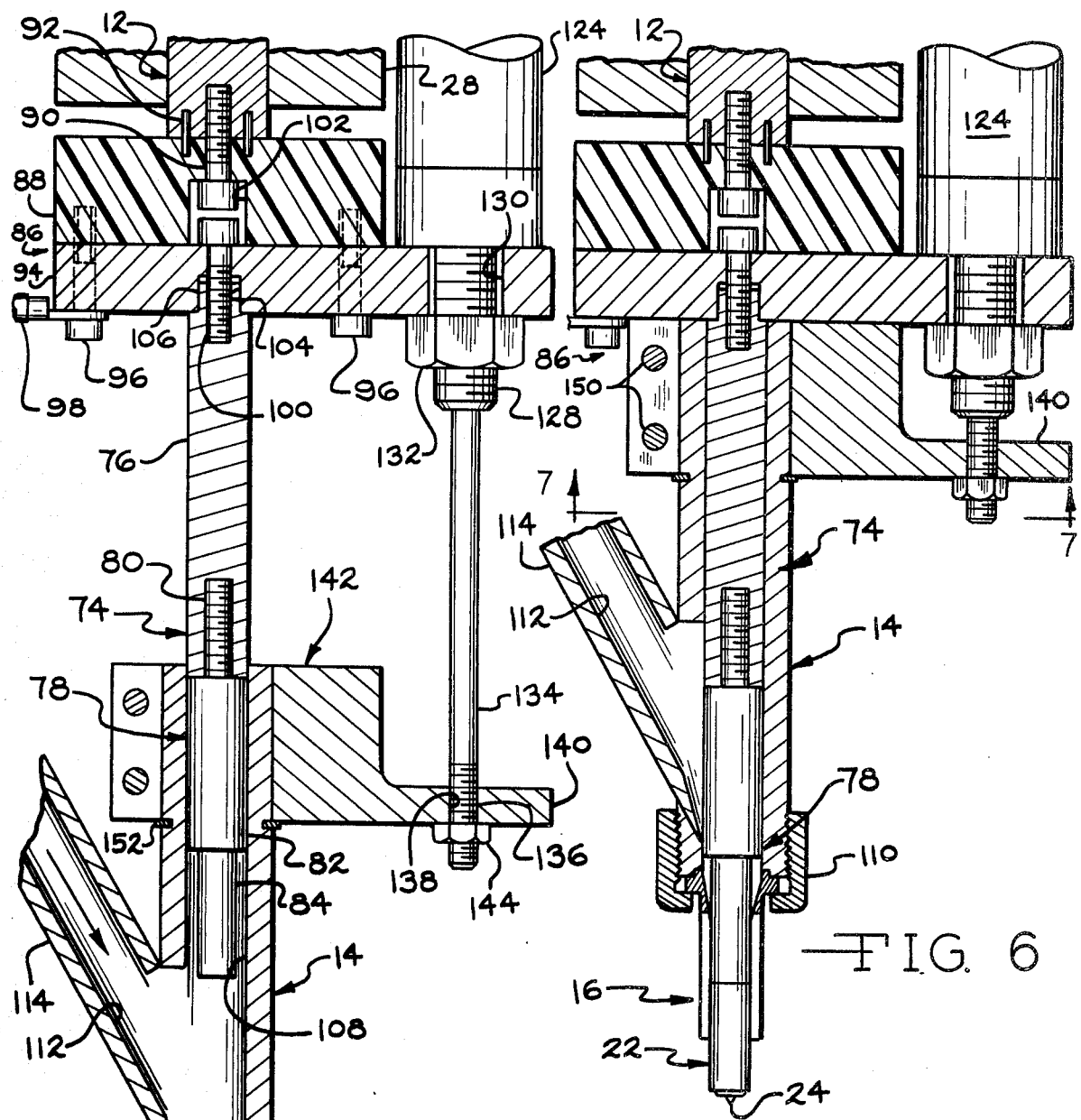
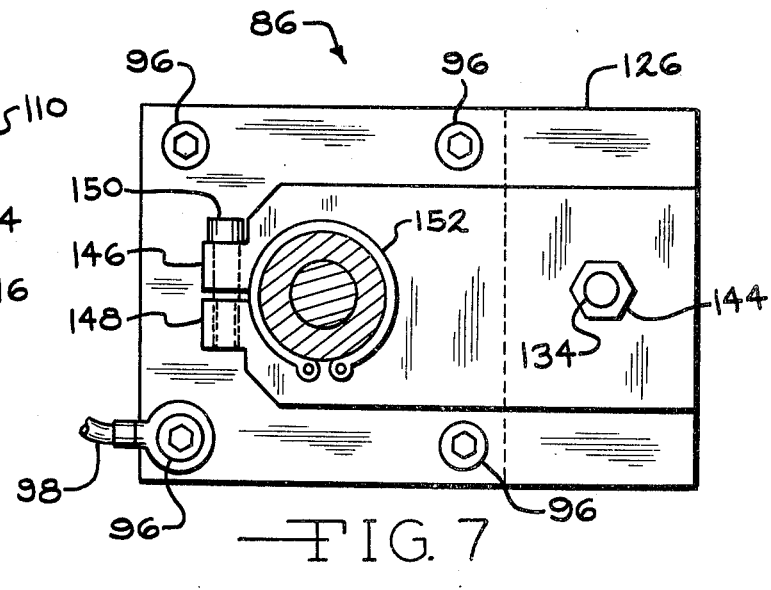
FIG. 5  FIG. 6  FIG. 7

APPARATUS FOR WELDING STUDS

This invention relates to a welding method and apparatus and particularly to drop welding embodying rapid loading of studs.

Welding apparatus using the drop welding technique comprises a ram mounted for vertical movement and carrying a chuck at its lower end. A stud is held in the chuck with an end protruding therefrom and is positioned a predetermined distance above a workpiece to which the stud is to be welded. An electrical potential is established between the stud and the workpiece and when the ram is released, the ram, chuck, and stud substantially freely fall toward the workpiece, with the stud being welded or fused thereto as it comes into contact therewith and a small tip on the stud flashes to establish a welding arc. The initial welding position of the stud above the workpiece can be raised or lowered and weights can be added to or subtracted from the ram to establish a given speed and force with which the stud contacts the workpiece. For larger diameter studs, a greater dropping distance and heavier weights are usually employed. A fluid-operated cylinder is often used with the ram to move it back to a position above the workpiece after a stud has been welded thereto.

Heretofore, welding apparatus of this type has been hand loaded, which is more difficult than with hand-manipulated welding tools because a relatively short distance exists in most instances between the chuck and the workpiece. With the attempts made to automatically load the studs, a movable plunger has been employed behind the stud to back it up in the chuck during welding. Heretofore, it has not been possible to design a plunger at a reasonable cost and with a high degree of reliability which can immovably back up the stud without resulting in bouncing when the stud contacts the workpiece, resulting in an improper weld.

Welding apparatus with stud loading provisions according to the invention embodies a back-up plunger affixed directly to a ram. The plunger extends into a loading passage formed in a chuck leg carrying a chuck at an end thereof. A feed passage communicates with an intermediate side portion of the loading passage. Means are provided to move the chuck leg and the chuck so as to place the back-up plunger at the rear of the feed passage in one position and near the chuck to back-up a newly-fed stud in another position. The movement of the chuck leg can be accomplished by a fluid-operated cylinder carried by the ram and having a piston rod connected to the chuck leg. With this arrangement, the back-up plunger is rigid during all movement of the apparatus during the welding cycle so as to eliminate any bouncing otherwise caused by a back-up plunger which is not solidly mounted. With this new loading operation, utmost reliability is also achieved and the cost of the loading components is held to a minimum.

It is, therefore, a principal object of the invention to provide drop welding apparatus with means for rapidly supplying studs thereto.

Another object of the invention is to provide welding apparatus with stud loading means incorporating a rigid back-up plunger.

A further object of the invention is to provide stud loading means for drop welding apparatus which is low in cost and has a high degree of reliability.

Yet another object of the invention is to provide rapid stud loading means for drop welding apparatus, which means incorporates a back-up plunger rigidly attached to a ram of the apparatus.

Yet a further object of the invention is to provide a method of loading studs into a chuck utilizing a rigid plunger and a movable chuck leg.

Many other objects and advantages of the invention will be apparent from the following detailed description of a preferred embodiment thereof, reference being made to the accompanying drawings, in which:

FIGS. 3 and 4 are schematic front views of the overall welding apparatus of FIG. 1, shown in two different positions;

FIG. 5 is an enlarged, fragmentary view in vertical cross section of loading components of the apparatus of FIG. 1, but shown in the position of FIG. 3;

FIG. 6 is a fragmentary view in vertical cross section of the components of FIG. 5, shown in the position of FIG. 4; and FIG. 7 is a view in section taken along the line 7—7 of FIG. 6.

Figures 1, 2:
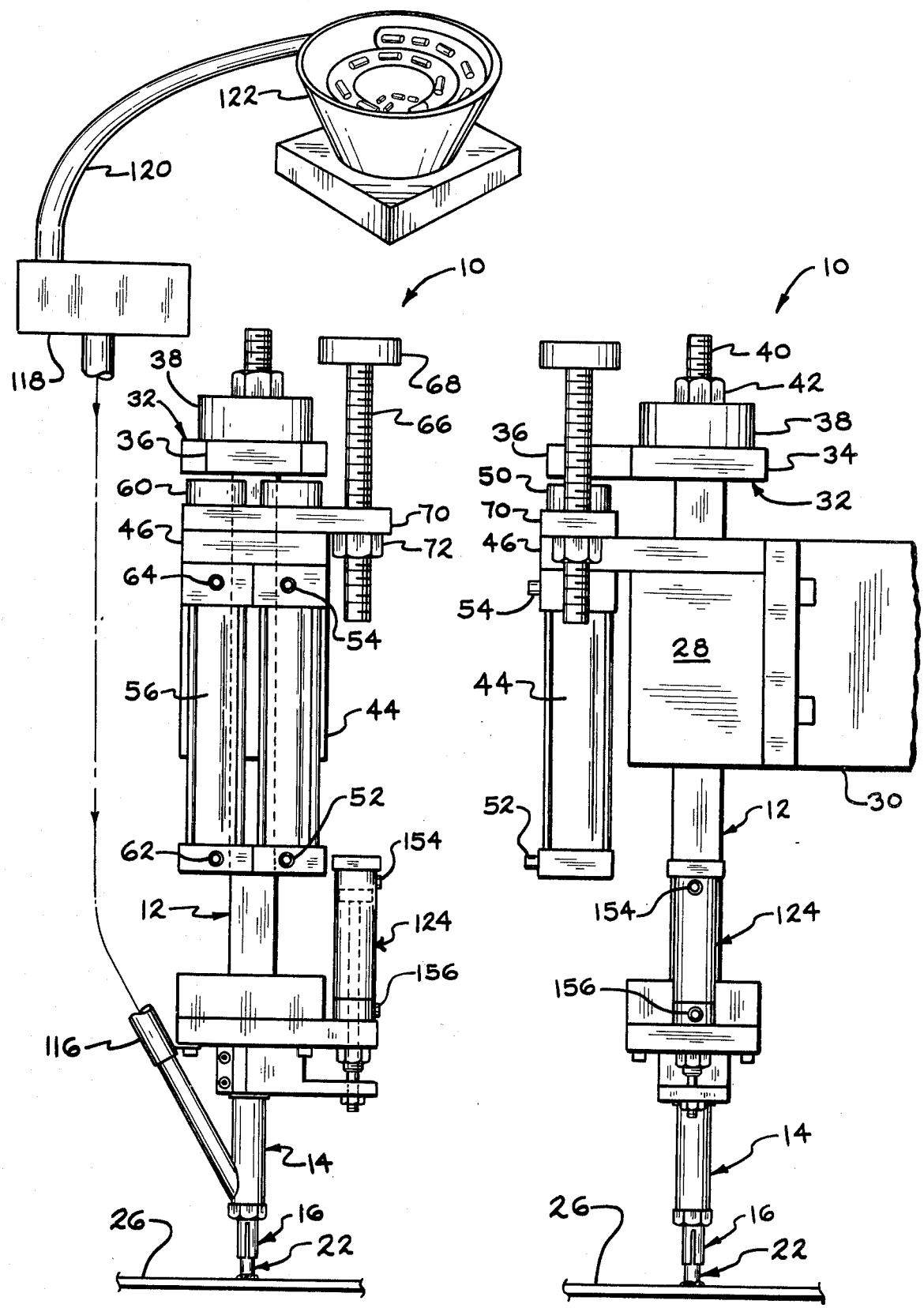
FIG. 1 is a somewhat schematic front view in elevation of welding apparatus embodying the invention.
FIG. 2 is a somewhat schematic side view in elevation of the apparatus of FIG. 1.

Referring to the drawings, and particularly to FIGS. 1 and 2, apparatus for welding studs by a drop technique is indicated at 10. The apparatus includes an elongate member or ram 12 below which is a chuck leg or member 14 carrying a chuck 16. The chuck 16 has slots 18 (FIG. 5) therein forming bifurcated fingers 20 which frictionally engage a stud 22. The stud 22 is of a known design, having a tip 24 of a desired size and shape which vaporizes when the stud is brought into contact with a workpiece 26 to initiate a welding arc between the stud and the workpiece. The ram 12 is guided for longitudinal movement toward and away from the workpiece 26 by a bearing block 28 which has a bracket 30 (FIG. 2) extending therefrom, the bracket being affixed to a suitable stand (not shown) to hold the bearing block 28 in a fixed position.

A stop plate 32 is affixed to the upper end of the ram 12 above the bearing block 28, the plate 32 including a main platform 34 and an extension 36. Weights 38 of a given size and shape are located on the platform 34, being held by a threaded rod 40 which extends upwardly from the platform 34 through holes in the weights and has a nut 42 to hold the weights 38 in position. If desired, all of the weights 38 can be of the same diameter with only the thickness changed to vary the mass. For example, the weights can vary from ¼ inch to 4 inches, in ¼-inch increments, and range from 1 pound to 16 pounds, in 1-pound increments.

A first fluid-operated cylinder 44 is supported by the bearing block 28 through a mounting plate 46 below the stop plate 32. The cylinder 44 has a piston rod 48 (FIGS. 3 and 4) extending upwardly therefrom and terminating in a head 50. Fluid is supplied to and exhausted from the lower end of the cylinder 44 through a fitting 52 and is supplied to and exhausted from the upper end by a fitting 54. The cylinder 44 along with the piston rod 48 and the head 50 support the ram 12 and the chuck 16 in an initial weld position, as shown in FIG. 4, from which the ram, the chuck, and the stud are dropped to weld the stud to the workpiece.

A second fluid-operated cylinder 56 is also carried by the mounting plate 46 and has a piston rod 58 (FIG. 3)

extending upwardly and terminating in a head 60. Fluid is supplied to and exhausted from the lower end of the second cylinder 56 by a fitting 62 and is supplied to and exhausted from the upper end of the cylinder 56 by an upper fitting 64. The second cylinder 56 is employed to move the ram 12 and the chuck 16 from the lower position of FIGS. 1 and 2 in which the stud carried by the chuck is welded to the workpiece, to an upper position in which the ram 12 is considerable distance above the workpiece, substantially as shown in FIG. 3.

The initial weld position, as shown in FIG. 4, is determined by an adjusting screw 66 having a stop head 68. The screw 66 extends through and is threadably-engaged with an arm 70 located on top of the mounting plate 46 and has a jam nut 72 which holds the screw 66 in a given position. The stop head 68 is located in the path of the piston rod head 50 to limit the upward movement of the piston rod 48, but is clear of the path of the extension 36 of the stop plate 32.

In the operation of the apparatus 10, after the stud 22 is welded to the workpiece 26, as shown in FIGS. 1 and 2, fluid is supplied under pressure to the lower fittings 52 and 62 of the cylinders 44 and 56. The piston rod 48 of the first cylinder then moves upwardly until the head 50 contacts the adjustable stop head 68, as shown in FIG. 3. At the same time, the piston rod 58 of the second cylinder 56 is moved upwardly beyond the stop head 68 and accordingly engages the extension 36 of the stop plate 32 to move it and the ram 12 to the upper position, again is shown in FIG. 3.

Preferably after the next stud 22 is properly positioned in the chuck 16, fluid is exhausted through the lower fitting 62 and is supplied through the upper fitting 64 of the cylinder 56 to quickly retract the piston rod 58. The piston rod 58 moves the head 60 to a position below the stop head 68 and specifically to a position adjacent the arm 70, as shown in FIG. 4. When the piston rod 58 retracts, the stud 22, the chuck 16, and the ram 12 move downwardly under the force of gravity until the extension 36 contacts the head 50 of the piston rod 48. With the extension 36 being in contact with the piston rod head 50, the ram 12, and the chuck 16 are in the initial weld position, as shown in FIG. 4.

The piston rod 48 holds the ram 12 in the initial weld position only temporarily, until the components have come into equilibrium after dropping from the upper position. Fluid is then supplied to the upper fitting 54 and exhausted from the lower fitting 52 of the cylinder 44 to quickly retract the piston rod 48 until the head 50 is adjacent the arm 70, as shown in FIGS. 1 and 2. At this time, the ram 12, the chuck 16, and the stud 22 fall freely under the force of gravity until the stud strikes or contacts the workpiece 26 and is welded thereto.

Heretofore, the studs 22 commonly have been hand loaded into the end of the chuck 16 when the apparatus is in the upper position of FIG. 3. This was relatively time-consuming, and substantially slowed down the overall welding cycle. While attempts have been made to feed the studs automatically into the chuck, the studs failed to be backed up rigidly while in the chuck to hold them firmly when striking the workpiece. Back-up plungers have been used to a limited extent to back up the studs but these plungers were operated and supported by resilient means in the form of springs or air-pressure and tended to yield when the studs struck the workpiece, causing them to bounce. Attempts have been made to lock the plunger in position when backing up the stud but this has resulted in a rather elaborate and expensive system and one which was not as reliable as might be desired.

The present invention provides a loading system and method for the apparatus 10 which solidly backs up the stud, and is relatively simple and reliable. Referring particularly to FIGS. 5-7, the loading system for the welding apparatus includes a back-up plunger or supporting member 74 which is connected to the ram 12 so as to move therewith and be rigidly supported thereby. The back-up plunger 74 includes a plunger leg 76 and a plunger head 78. The latter is removably connected to the former, by means of a threaded shank 80, for example, so that the plunger head can be changed, along with the chuck 16, to accommodate studs of different sizes of diameters. As shown, the plunger head 78 includes a larger diameter rear portion 82 and a smaller diameter forward portion 84 which can extend into the chuck 16.

The plunger leg 76 is connected to the ram 12 through an adaptor 86. The adaptor includes an upper insulating part or block 88 which is affixed to the lower end of the ram 12 by a cap screw 90 and roll pins 92. A lower part or plate 94 is fastened to the upper part 88 by threaded fasteners or screws 96. To establish an electrical potential between the stud 22 and the workpiece 26, a welding cable 98 is connected to the lower plate 94 by one of the fasteners 96. The cable 98 is connected to a suitable power source and controls, which in turn are also connected to the workpiece 26, in a manner known in the art. The upper block 88 of the adaptor 86, being made of insulating material, electrically isolates the ram 12 from the cable 98. The lower plate 94 is connected to the plunger leg 76 by a cap screw 100, the head of which is received in a recess 102 of the insulating block 88 along with the head of the cap screw 90. The plate 94 also has a cylindrical recess 104 which receives a smaller diameter stem 106 of the plunger leg 76 to help maintain the leg 76 in alignment with the ram 12 and perpendicular to the workpiece 26.

The plunger 74 projects into a loading passage 108 formed by the chuck leg 14 and extending completely therethrough from one end to the other. The chuck 16 is located at the lower end of the loading passage 108 and is held in position by a nut 110. A feed passage 112 communicates with an intermediate side portion of the loading passage 108, the feed passage being formed in an angularly-extending tube 114.

The studs 22 can be fed through the feed passage 112 by hand, being dropped in the upper end thereof, or can be fed through a flexible tube 116 from an escapement 118 to which the studs are supplied through a tube or track 120 from a suitable source 122. The source 122 can be a vibratory feeder, by way of example. The escapement, which is of a type well known in the art, transfers the studs one at a time from the track 120 and blows them through the tube 116 and the feed passage 112 into the lower end of the loading passage 108 where they come to rest partly in the chuck 16, as generally shown in FIG. 5.

it is desired to move the back-up plunger 74 from a position in the loading passage 108 at the rear of the feed passage 112, as shown in FIG. 5, to a position in which the plunger head 78 pushes the stud 22 partially through the chuck 16 and backs it up during the welding operation, as shown in FIG. 6. Since the plunger 74 is held in a fixed position relative to the ram 12, the chuck leg 14 is moved to accomplish the desired movements. For this purpose, a fluid-operated cylinder 124 can be mounted on an extension 126 of the lower plate 94. Specifically, the cylinder 124 can have a threaded tubular shank 128 extending through an opening 130 in the plate extension 126 and held by a jam nut 132. The cylinder 124 thereby is carried by the ram 12, moving therewith so that the cylinder is always in a fixed position relative to the ram 12. A piston rod 134 extends from the cylinder 124 and has a threaded end 136 turned into a tapped hole 138 in an extension plate 140 of a collar 142, being held by a jam nut 144. The collar 142 has bifurcated ends 146 and 148 (FIG. 7) which extend around the upper end of the chuck leg 14 and are clamped by machine screws 150. The collar 142 also bears against a snap ring 152 located around the chuck leg 14 to prevent the possibility of the collar 142 moving down relative to the chuck leg upon repeated impacts of the studs with the workpiece.

In the operation of the loading mechanism, when fluid under pressure is supplied to a fitting 154 (FIG. 1) at the blind end of the cylinder 124, the piston rod 134 is extended, moving the chuck leg 14 downwardly relative to the plunger 74 so that the plunger 74 is spaced from the chuck 16 and behind the feed passage 112, as shown in FIG. 5. At this time, the studs can be dropped by hand into the feed tube from the escapement 118. The timing of the movement of the chuck leg 14 and the supply of the stud through the feed passage is not critical since if the stud is fed before the plunger 74 is behind the feed passage 112, the forward end of the stud will simply rest against the plunger until it is completely back of the feed passage.

When fluid under pressure is supplied through a fitting 156 (FIG. 1) to the rod end of the cylinder 124, the piston rod 134 is retracted to move the chuck leg 14 toward the plunger 74, to move it through the loading passage 108 until it contacts the stud 22, pushes it further into the chuck 16, and backs it up with the end projecting from the chuck 16, as shown in FIG. 6. When in this position, the stud 22 is ready to be welded to the workpiece 26 and, since the plunger 74 is rigidly connected to the ram 12, the plunger cannot move when the stud strikes the workpiece and the stud will not bounce as heretofore has occurred without a rigid, immovable connection for the plunger.

In the operation of the overall apparatus, after the stud 22 is welded to the workpiece 26, as shown in FIGS. 1 and 2, fluid under pressure is supplied to the lower ends of the cylinders 44 and 56 to retract the ram 12 and the chuck leg 14 from the workpiece, moving to the position of FIG. 3. During this movement, fluid under pressure can be supplied to the blind end of the cylinder 124 to extend the chuck leg 14 toward the position of FIGS. 3 and 5, and one of the studs 22 can be supplied to the feed tube 114. This timing is not critical as long as the chuck leg 14 is not extended so soon that the chuck 16 hits the end of the newly-welded stud.

After the ram 12 reaches the upper position, fluid under pressure is supplied to the rod end of the cylinder 56 to quickly retract the piston rod 58 and to enable the ram 12 to move down to the position adjacent the head 50 of the piston rod 48, as shown in FIG. 4. Preferably by this time, fluid has been supplied to the rod end of the chuck leg cylinder 124 to retract the chuck leg 14 and to move the stud against the plunger 74 and to push the stud to the welding position in the chuck 16, as shown in FIG. 6. The timing here again is not critical as long as the plunger 74 fully backs up the stud 22 in the chuck 16 prior to the stud striking or contacting the workpiece 26.

After the components reach the position of FIG. 4, fluid is supplied to the rod end of the cylinder 44 to quickly retract the piston rod 48 and the head 50 to enable the ram 12, the chuck leg 14, and the chuck 16 to fall substantially freely until the stud 22 contacts the workpiece, at which time the stud tip 24 is flashed due to the voltage potential between the stud and the workpiece, and the weld is effected and completed.

Since the studs are not inserted into the lower end of the chuck 16 with the loading arrangement according to the invention, it is not necessary for the chuck 16 to be raised as far above the workpiece 26 as otherwise desirable. Consequently, the cylinder 56, along with its relative components, can be eliminated with the ram 12 then simply being raised from the welding position of FIGS. 1 and 2 to the initial weld position of FIG. 4 by means of the cylinder 44, the piston rod 48, the head 50, and the adjustable stop 68. With the cylinder 56 eliminated and the cylinder 124 added, the apparatus for rapidly loading the studs is little more, if any, complicated than where the studs are hand loaded.

Various modifications of the above-described embodiment of the invention will be apparent to those skilled in the art and it is to be understood that such modifications can be made without departing from the scope of the invention, if they are within the spirit and the tenor of the accompanying claims.

I claim:

1. Stud welding apparatus comprising a ram mounted for movement between an upper position and a lower position, a plunger connected to the lower end of said ram to move therewith and be rigidly supported thereby at all times during a welding cycle, means forming a loading passage mounted for longitudinal movement with respect to said plunger, said passage means having a chuck at the lower end thereof and a feed passage communicating with said loading passage, means carried by said ram for moving said passage means between a first position in which said plunger is spaced from said chuck and behind said feed passage and a second position in which said plunger is near said chuck to back up a stud held by said chuck and received from said feed passage, means mounted for longitudinal movement with respect to said ram for holding said ram at the upper position and for enabling said ram, said plunger, and said chuck to drop to the lower position to enable an end of the stud to contact a workpiece, and means for producing an electrical potential between the stud and the workpiece to cause the stud to be fused to the workpiece when they come in contact.

2. Stud welding apparatus according to claim 1 characterized by said moving means comprising a fluid-operated cylinder mounted for movement with respect to said ram and a piston rod extending from said cylinder and connected to said passage means.

3. Stud welding apparatus according to claim 1 characterized by means for feeding studs one at a time to said feed passage.

4. Stud welding apparatus according to claim 1 characterized by said loading passage forming means being a chuck leg with the loading passage extending longitudinally therethrough from one end to another, and said chuck being connected to said chuck leg at the lower end of the loading passage.

5. Stud welding apparatus according to claim 4 characterized by said feed passage communicating with an intermediate side portion of the loading passage.

6. Stud welding apparatus according to claim 1 characterized by said electrical potential producing means comprising a cable, said plunger being connected to said ram by a conducting plate to which said cable is connected.

7. Stud welding apparatus according to claim 6 characterized by said plunger further being connected to said ram by an insulating block affixed to the lower end of said ram and to said conducting plate.

8. Stud welding apparatus comprising a ram movable between a retracted position spaced from a workpiece and a forward position toward the workpiece, a plunger connected to the end of said ram closer to the workpiece to move with said ram and be rigidly supported thereby at all times during a welding cycle, a chuck leg forming a loading passage into which said plunger extends, said chuck leg having a chuck at an end thereof and a feed passage communicating with a side portion of said loading passage, means for moving said chuck leg between a first position in which said plunge is spaced from said chuck and is behind said feed passage and a second position in which said plunger is near said chuck and in a position to back up a stud held by said chuck, and means for producing an electrical potential between the stud held by said chuck and the workpiece to cause the stud to be welded to the workpiece when they are brought into contact with one another.

9. Stud welding apparatus according to claim 8 characterized by said chuck leg moving means comprising a fluid-operated cylinder movable with said ram and having a piston rod connected to said chuck leg.

10. Stud welding apparatus according to claim 8 characterized by means for feeding studs one at a time to said feed passage.

11. Stud welding apparatus according to claim 10 characterized by said stud-feeding means comprising a flexible tube communicating with said feed passage, an escapement communicating with said flexible tube, and a source of studs communicating with said escapement.

12. Stud welding apparatus according to claim 8 characterized by said plunger comprising a plunger leg and a plunger head removably connected to said plunger leg, whereby said plunger head can be changed to accommodate studs of different sizes.

13. Stud welding apparatus comprising a back-up plunger, means affixed to said back-up plunger for moving said back-up plunger between a retracted position spaced from a workpiece and a forward position toward the workpiece, said back-up plunger being rigidly supported by said moving means at all times during a welding cycle, means forming a loading passage into which said plunger extends, said loading passage means having means at one end thereof for holding a stud, and means for moving said loading passage means between a position in which said plunger is spaced from said stud-holding means and a position in which said plunger is near said stud-holding means to back up and rigidly support a stud held thereby.

14. Stud welding apparatus according to claim 13 characterized by said means for moving said loading passage means comprising a fluid-operated cylinder and a piston rod, one of said cylinder and said rod being connected to said loading passage means and the other of said cylinder and said rod being connected to said plunger-moving means.

15. Stud welding apparatus according to claim 13 characterized by means forming a feed passage communicating with said loading passage.

16. Stud welding apparatus according to claim 15 characterized by means for feeding studs one at a time to said feed passage.

17. Stud welding apparatus according to claim 15 characterized by said feed passage communicating with an intermediate side portion of said loading passage.

18. Stud welding apparatus according to claim 13 characterized by said loading passage means being a chuck leg with the loading passage extending longitudinally therethrough, and said stud holding means is a chuck connected to an end of said chuck leg.

19. Stud welding apparatus according to claim 13 characterized by said back-up plunger having a plunger leg and a plunger head, said plunger head being removably connected to said plunger leg whereby said plunger head can be changed to accommodate studs of different sizes.

* * * * *

UNITED STATES PATENT AND TRADEMARK OFFICE
CERTIFICATE OF CORRECTION

PATENT NO. : 4,019,013
DATED : April 19, 1977
INVENTOR(S) : Steve Spisak

It is certified that error appears in the above-identified patent and that said Letters Patent are hereby corrected as shown below:

Column 4, line 61, for "it" substitute --It--.

Column 5, line 26, after "tube" insert --114 or blown into the feed tube--.

Column 6, line 17, for "relative" substitute --related--.

Column 7, line 23, for "plunge" substitute --plunger--

Signed and Sealed this fifth Day of July 1977

[SEAL]

Attest:

RUTH C. MASON
Attesting Officer

C. MARSHALL DANN
Commissioner of Patents and Trademarks